US 9,231,442 B2

(12) United States Patent
Senba (10) Patent No.: US 9,231,442 B2
(45) Date of Patent: Jan. 5, 2016

(54) POWER SUPPLY CIRCUIT AND BASE STATION

(71) Applicant: FUJITSU LIMITED, Kawasaki-shi, Kanagawa (JP)

(72) Inventor: Yasuhiro Senba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 494 days.

(21) Appl. No.: 13/687,878

(22) Filed: Nov. 28, 2012

(65) Prior Publication Data

US 2013/0241492 A1 Sep. 19, 2013

(30) Foreign Application Priority Data

Mar. 19, 2012 (JP) .................. 2012-062892

(51) Int. Cl.
*H01M 10/48* (2006.01)
*H02J 13/00* (2006.01)
*H02J 7/00* (2006.01)

(52) U.S. Cl.
CPC . *H02J 13/00* (2013.01); *H02J 7/00* (2013.01); *H02J 7/0024* (2013.01); *H02J 7/0068* (2013.01); *Y10T 307/944* (2015.04)

(58) Field of Classification Search
CPC .............................. H02J 7/0024; H02J 7/0072
USPC ................ 320/103, 107, 116, 117, 121, 128; 307/66
See application file for complete search history.

(56) References Cited

U.S. PATENT DOCUMENTS

| 6,476,583 | B2* | 11/2002 | McAndrews | 320/119 |
| 2002/0017893 | A1* | 2/2002 | Duff, Jr. | 320/100 |
| 2002/0186576 | A1 | 12/2002 | Kanouda et al. | |
| 2003/0184937 | A1 | 10/2003 | Kanouda et al. | |
| 2004/0145926 | A1 | 7/2004 | Kanouda et al. | |
| 2008/0079393 | A1* | 4/2008 | Spartano et al. | 320/110 |
| 2011/0298626 | A1* | 12/2011 | Fechalos et al. | 340/664 |

FOREIGN PATENT DOCUMENTS

JP 2002-369407 A 12/2002

* cited by examiner

*Primary Examiner* — Edward Tso
(74) *Attorney, Agent, or Firm* — Arent Fox LLP (57) ABSTRACT

A power supply circuit comprising: a load; a resistor coupled the load; a first secondary battery; a second secondary battery; a switch configured to switch between a first state in which the first secondary battery and the second secondary battery are charged and a second state in which load current is supplied from the first secondary battery and the second secondary battery to the load based on current flowing through the resistor; and a shunt regulator configured to control the switch.

14 Claims, 8 Drawing Sheets

POWER SUPPLY CIRCUIT AND BASE STATION

CROSS-REFERENCE TO RELATED APPLICATION

This application is based upon and claims the benefit of priority of the prior Japanese Patent Application No. 2012-62892, filed on Mar. 19, 2012, the entire contents of which are incorporated herein by reference.

FIELD

The embodiments discussed herein are related to a power supply circuit and a base station.

BACKGROUND

In a typical power supply circuit, a regulated power supply circuit is provided at an upstream of a load and a secondary battery is provided at an upstream of the regulated power supply circuit. The secondary battery is used to supply load current in such a power supply circuit.

For example, a related technology is disclosed in Japanese Laid-open Patent Publication No. 2002-369407.

SUMMARY

According to one aspect of the embodiments, a power supply circuit includes: a load; a resistor coupled the load; a first secondary battery; a second secondary battery; a switch configured to switch between a first state in which the first secondary battery and the second secondary battery are charged and a second state in which load current is supplied from the first secondary battery and the second secondary battery to the load based on current flowing through the resistor; and a shunt regulator configured to control the switch.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
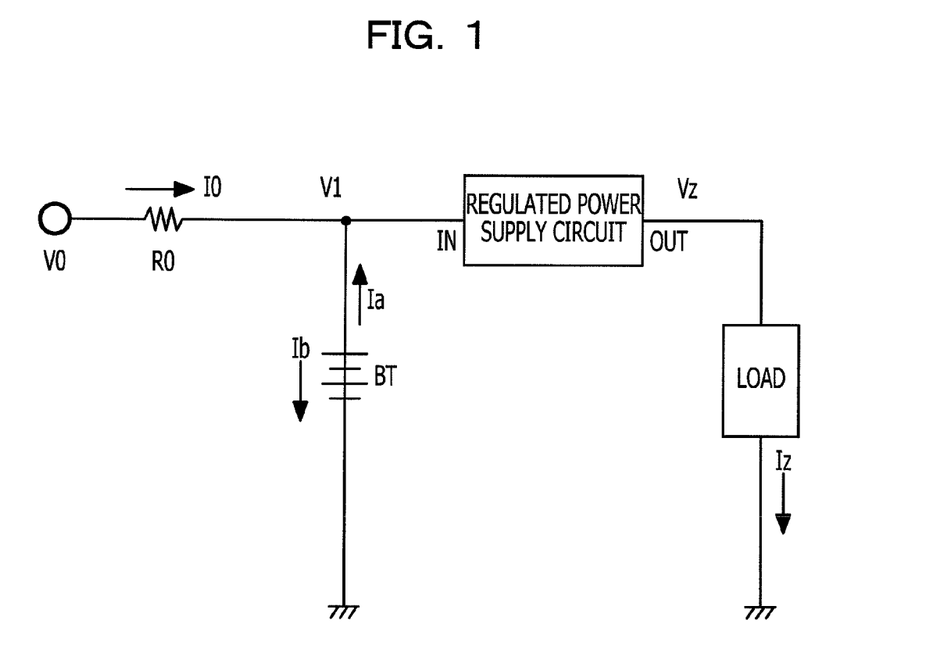
FIG. 1 illustrates an exemplary power supply circuit.

FIG. 1 illustrates an exemplary power supply circuit.

In the power supply circuit illustrated in FIG. 1, a regulated power supply circuit is provided at an upstream of a load and a secondary battery BT is provided at an upstream of the regulated power supply circuit. For example, an output side OUT of the regulated power supply circuit is coupled to one end of the load. The other end of the load, which is different from the one end of the load coupled to the regulated power supply circuit, is grounded. An input side IN of the regulated power supply circuit is coupled to one end of a resistor R0 and the plus side of the secondary battery BT. The other end of the resistor R0, which is different from the one end of the resistor R0 coupled to the regulated power supply circuit, is an input terminal to which a voltage V0 is applied. The minus side of the secondary battery BT is grounded.

A power supply applies the voltage V0 to the input terminal. The voltage V0 is to be applied to the load. If the application of the voltage V0 is stopped upon occurrence of, for example, power outage, current Ia flows from the secondary battery BT to the load. For example, the power supply is backed up by the secondary battery BT. A voltage V1 of the secondary battery BT is set to a value lower than the voltage V0 of the power supply.

The current may be directly supplied from the secondary battery BT to the load to compensate for the current in the power supply circuit. When the current is directly supplied from the secondary battery BT to the load, a voltage Vz to be applied to the load is varied.

In order to reduce the variation in the voltage Vz, the current is supplied from the secondary battery BT to the input side IN of the regulated power supply circuit in the power supply circuit illustrated in FIG. 1. Loss Pl occurring in the regulated power supply circuit is represented by Equation (1):

$$Pl = (I0 + Ia)V1 - Iz \times Vz \qquad (1)$$

where I0 denotes the current flowing through the resistor R0, Ia denotes the current supplied from the secondary battery BT to the load, V1 denotes the voltage at the input side IN of the regulated power supply circuit, Iz denotes the current flowing through the load, and Vz denotes the voltage at the output side OUT of the regulated power supply circuit.

According to Equation (1), the current Ia is supplied from the secondary battery BT to the input side IN of the regulated power supply circuit, thereby causing a loss corresponding to the efficiency of the regulated power supply circuit.

In a compact apparatus, such as a remote radio head (RRH), installed outside, an unmetered electric service may be used, instead of a metered electric service. The RRH may be referred to as remote radio equipment (RRE).

The power consumption may be controlled so as to be lower than or equal to a predetermined power in the unmetered electric service. However, a peak power higher than the predetermined power in the unmetered electric service may occur in the power supply circuit.

In the power supply circuit, if the current of the load exceeds a predetermined value of the current supplied from the power supply, the supply voltage is decreased. The decrease in the supply voltage decreases the current to decrease the power consumed by the load. Although the decrease in the power consumed by the load degrades the performance or the function of the load, the supply voltage and the current increase in response to the degradation of the performance or the function of the load.

The same reference numerals are used in the following diagrams to identify the components having substantially the same function or similar functions. A repeated description of such components may be omitted or reduced.

Figure 2:
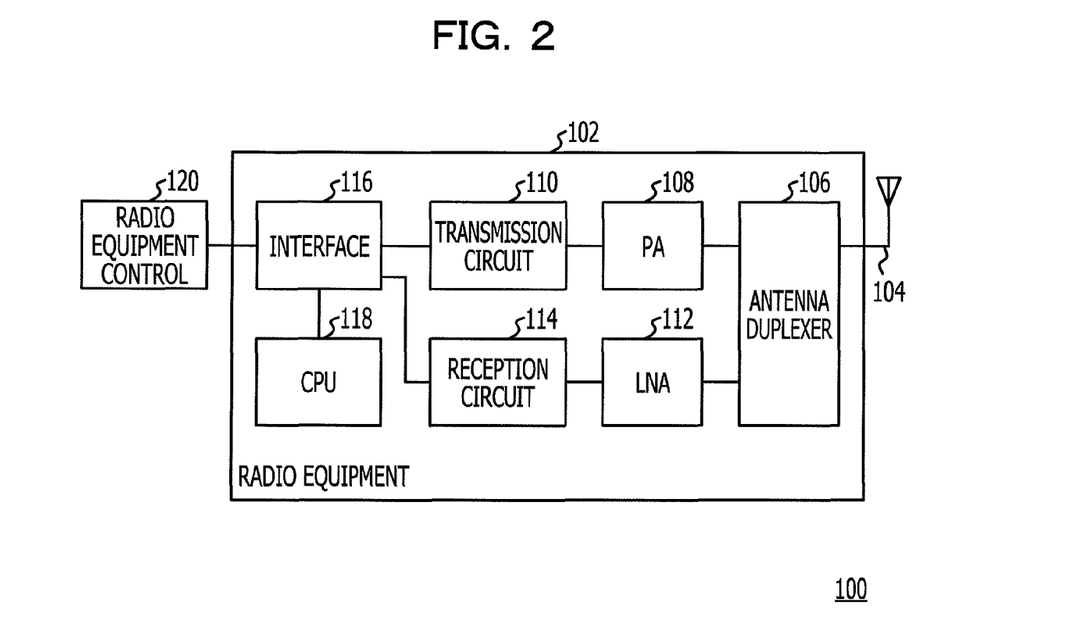
FIG. 2 illustrates an exemplary base station.

FIG. 2 illustrates an exemplary base station. Referring to FIG. 2, a base station 100 may be a remote radio head.

The base station 100 includes a radio equipment (RE) 102 and a radio equipment control (REC) 120. The radio equipment 102 may be coupled to the radio equipment control 120 via, for example, an optical fiber. The radio equipment 102 may be separated from the radio equipment control 120 because of the connection between the radio equipment 102 and the radio equipment control 120 via, for example, the optical fiber. Since the radio equipment 102 is provided near an antenna 104, the cable loss may be reduced and the power consumption in the base station 100 may be reduced.

The radio equipment 102 includes the antenna 104, an antenna duplexer 106, a power amplifier (PA) 108, a transmission circuit 110, a low noise amplifier (LNA) 112, a reception circuit 114, an interface 116, and a central processing unit (CPU) 118.

A radio signal from the antenna 104 is input into the low noise amplifier 112 through the antenna duplexer 106. The antenna duplexer 106 is coupled to the antenna 104. The antenna duplexer 106 supplies the radio signal from the antenna 104 to the low noise amplifier 112. The low noise amplifier 112 is coupled to the antenna duplexer 106. The low noise amplifier 112 amplifies the radio signal from the antenna duplexer 106. The low noise amplifier 112 supplies the amplified radio signal from the antenna duplexer 106 to the reception circuit 114.

The reception circuit 114 is coupled to the low noise amplifier 112. The reception circuit 114 performs reception processing on the radio signal from the low noise amplifier 112. The reception circuit 114 supplies the signal that is subjected to the reception processing to the radio equipment control 120 via the interface 116. The interface 116 is coupled to the reception circuit 114. The interface 116 may be an interface between the reception circuit 114 and the radio equipment control 120. The interface 116 may be, for example, a common public radio interface (CPRI). The CPRI may include a field programmable gate array (FPGA). The FPGA may be controlled by the CPU 118.

The radio equipment control 120 is coupled to the interface 116. The radio equipment control 120 processes the signal supplied from the reception circuit 114 through the interface 116. A data signal from the radio equipment control 120 is supplied to the transmission circuit 110 through the interface 116.

The transmission circuit 110 is coupled to the interface 116. The transmission circuit 110 performs transmission processing on the data signal supplied from the radio equipment control 120 through the interface 116. The transmission circuit 110 supplies the data signal subjected to the transmission processing to the power amplifier 108.

The power amplifier 108 is coupled to the transmission circuit 110. The power amplifier 108 amplifies the data signal subjected to the transmission processing in the transmission circuit 110. The data signal amplified by the power amplifier 108 is transmitted from the antenna 104.

The power amplifier 108 includes a power supply circuit 200.

Figure 3:
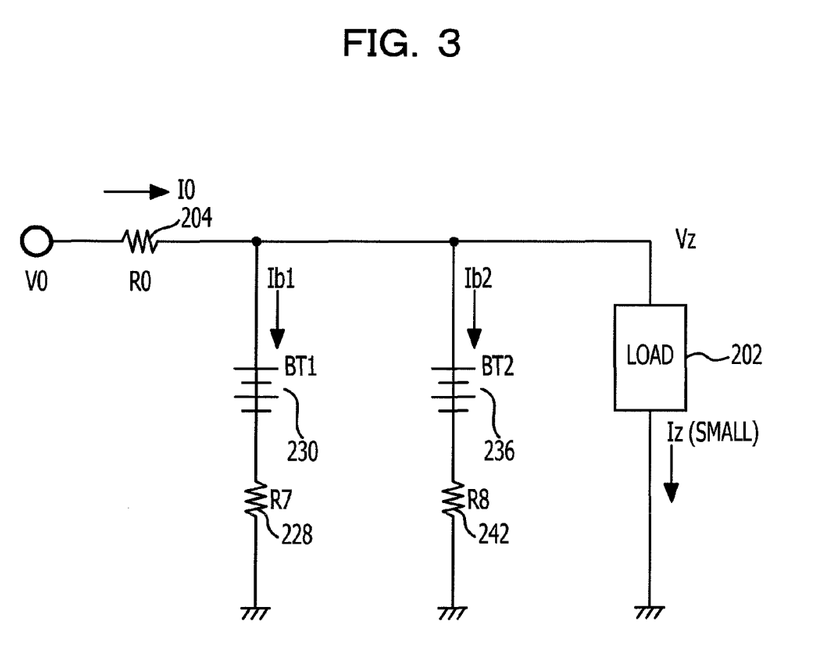
FIG. 3 illustrates an exemplary power supply circuit.

FIG. 3 illustrates an exemplary power supply circuit. An equivalent circuit of part of the power supply circuit 200 may be illustrated in FIG. 3. For example, an equivalent circuit when a secondary battery included in the power supply circuit 200 is charged with current may be illustrated in FIG. 3.

Multiple secondary batteries are provided in the power supply circuit 200. Referring to FIG. 3, two secondary batteries, a secondary battery (BT1) 230 and a secondary battery (BT2) 236, are provided. Three or more secondary batteries may be provided.

A resistor (R0) 204, a resistor (R7) 228, and a resistor (R8) 242 are provided in the power supply circuit 200.

The plus side of the secondary battery (BT1) 230, the plus side of the secondary battery (BT2) 236, one end of the resistor (R0) 204, and one end of a load 202 are coupled to each other.

A voltage V0 is applied from a power supply (not illustrated) to the other end of the resistor (R0) 204, which is different from the one end of the resistor (R0) 204 coupled to the plus side of the secondary battery (BT1) 230, the plus side of the secondary battery (BT2) 236, and the one end of the load 202.

The minus side of the secondary battery (BT1) 230 is grounded via the resistor (R7) 228. The minus side of the secondary battery (BT2) 236 is grounded via the resistor (R8) 242.

The other end of the load 202, which is different from the one end of the load 202 coupled to the one end of the resistor (R0) 204, the plus side of the secondary battery (BT1) 230, and the plus side of the secondary battery (BT2) 236, is grounded.

A voltage resulting from addition of the voltage of the secondary battery (BT2) 236 to the voltage of the secondary battery (BT1) 230 may be set to a voltage lower than the voltage V0 of the power supply. The capacitance of the secondary battery (BT1) 230 may be different from that of the secondary battery (BT2) 236. The capacitance of the secondary battery (BT1) 230 may be substantially equal to that of the secondary battery (BT2) 236.

Referring to FIG. 3, the current flowing through the resistor (R0) 204 is denoted by "current I0" and the load current flowing through the load 202 is denoted by "load current Iz." When the load current Iz is smaller than the current I0, the current I0 flowing through the resistor (R0) 204 flows through the secondary battery (BT1) 230 and the secondary battery (BT2) 236. The current flowing through the secondary battery (BT1) 230 is denoted by "current Ib1" and the current flowing through the secondary battery (BT2) 236 is denoted by "current Ib2." For example, I0=Ib1+Ib2+Iz. The secondary battery (BT1) 230 is charged with the flowing current Ib1. The secondary battery (BT2) 236 is charged with the flowing current Ib2.

Figure 4:
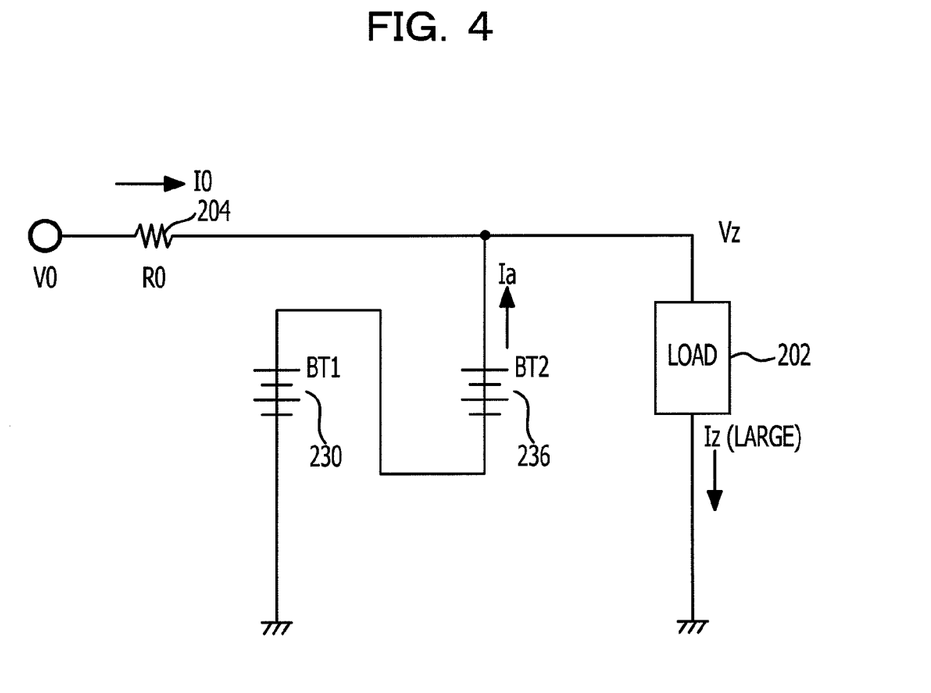
FIG. 4 illustrates an exemplary power supply circuit.

FIG. 4 illustrates an exemplary power supply circuit. An equivalent circuit of part of the power supply circuit 200 may be illustrated in FIG. 4. For example, an equivalent circuit when a secondary battery included in the power supply circuit 200 discharges may be illustrated in FIG. 4.

The resistor (R7) 228 and the resistor (R8) 242 illustrated in FIG. 3 may be omitted from the exemplary power supply circuit in FIG. 4.

In the power supply circuit 200 in FIG. 4, multiple secondary batteries are coupled in series to each other. Referring to FIG. 4, the two secondary batteries, the secondary battery (BT1) 230 and the secondary battery (BT2) 236, are coupled in series to each other. Three or more secondary batteries may be coupled in series to each other. The capacitance of the secondary battery (BT1) 230 may be different from that of the secondary battery (BT2) 236. The capacitance of the secondary battery (BT1) 230 may be substantially equal to that of the secondary battery (BT2) 236. The substantial equality between the capacitance of the secondary battery (BT1) 230 and the capacitance of the secondary battery (BT2) 236 may reduce non-flowing of the current based on completion of the discharge of either of the secondary batteries.

The plus side of the secondary battery (BT2) 236, one end of the resistor (R0) 204, and one end of the load 202 are coupled to each other. The voltage V0 is applied from a power supply to the other end of the resistor (R0) 204, which is different from the one end of the resistor (R0) 204 coupled to the plus side of the secondary battery (BT2) 236 and the one end of the load 202.

The minus side of the secondary battery (BT2) 236 is coupled to the plus side of the secondary battery (BT1) 230. The minus side of the secondary battery (BT1) 230 is grounded.

The other end of the load 202, which is different from the one end of the load 202 coupled to the one end of the resistor (R0) 204 and the plus side of the secondary battery (BT2) 236, is grounded.

When the load current Iz is larger than the current I0, the current flows from the secondary battery (BT1) 230 and the secondary battery (BT2) 236 to the load 202. The current flowing through the battery including the series connection of the secondary battery (BT1) 230 and the secondary battery (BT2) 236 is denoted by "Ia." For example, I0+Ia=Iz. The current Ia supplied from the battery including the series connection of the secondary battery (BT1) 230 and the secondary battery (BT2) 236 and the current I0 supplied from the power supply are supplied to the load 202.

Multiple secondary batteries are provided in the power supply circuit 200. When the load current Iz is smaller than the current I0, the secondary battery (BT1) 230 and the secondary battery (BT2) 236 are charged with the current (the current Ib1+the current Ib2) resulting from subtraction of the load current Iz from the current I0. When the load current Iz is larger than the current J0, the current Ia resulting from subtraction of the current I0 from the load current Iz is supplied from the battery including the series connection of the secondary battery (BT1) 230 and the secondary battery (BT2) 236. For example, when the load current Iz has a value near the peak, the parallel connection between the secondary battery (BT1) 230 and the secondary battery (BT2) 236 is switched to the series connection from the series connection and the current Ia is supplied from the battery including the series connection. Since the current Ia is supplied from the battery including the series connection of the secondary battery (BT1) 230 and the secondary battery (BT2) 236, the current may be stably supplied to the load 202.

Figure 5:
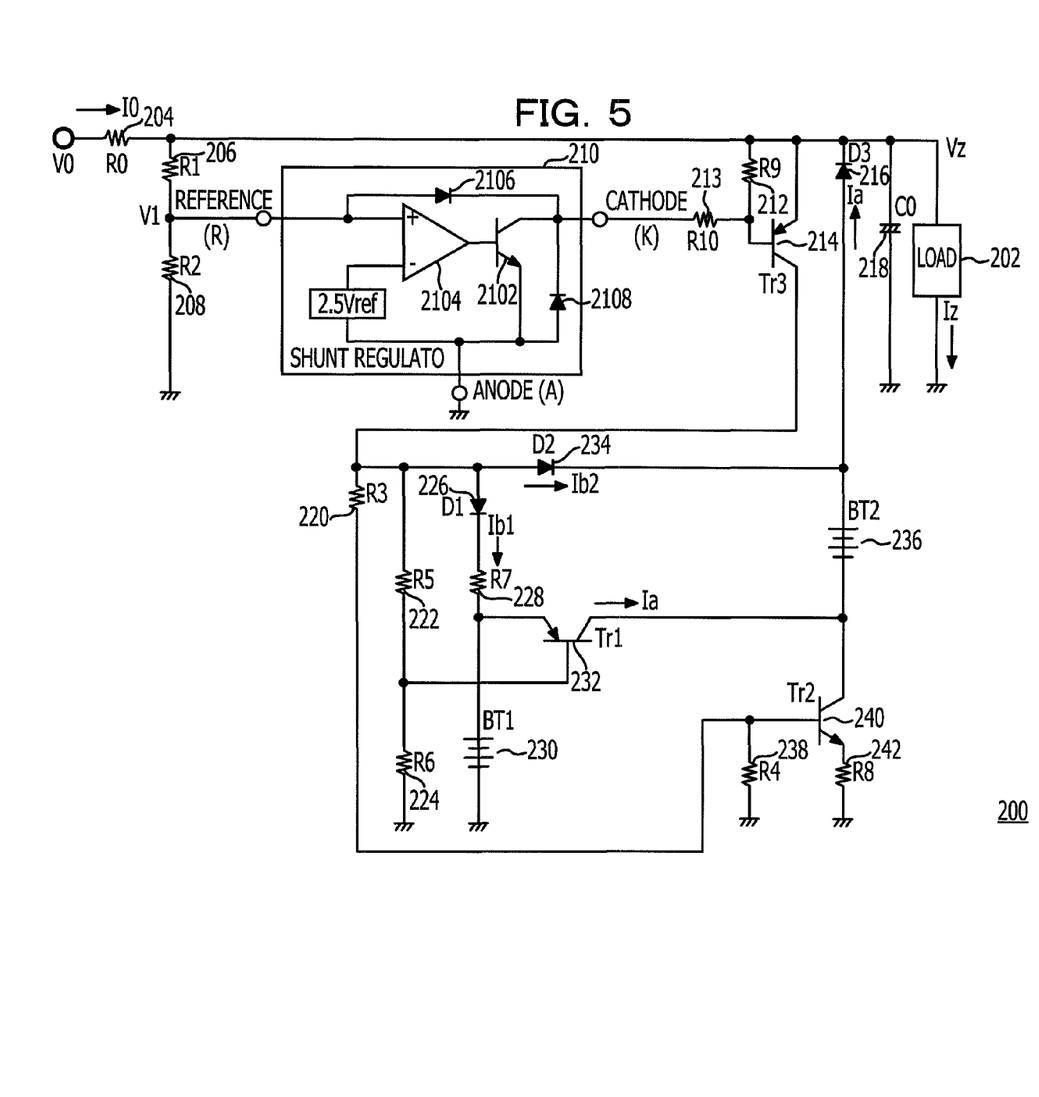
FIG. 5 illustrates an exemplary power supply circuit.

FIG. 5 illustrates an exemplary power supply circuit. The power supply circuit 200 may be included in the power amplifier 108.

Referring to FIG. 5, the power supply circuit 200 includes the resistor (R0) 204, a resistor (R1) 206, a resistor (R2) 208, a resistor (R3) 220, and a resistor (R4) 238. The power supply circuit 200 includes a resistor (R5) 222, a resistor (R6) 224, the resistor (R7) 228, the resistor (R8) 242, a resistor (R9) 212, and a resistor (R10) 213.

The power supply circuit 200 includes a shunt regulator 210, a capacitor (C0) 218, the secondary battery (BT1) 230, and the secondary battery (BT2) 236.

The power supply circuit 200 includes a transistor (Tr1) 232, a transistor (Tr2) 240, and a transistor (Tr3) 214.

The power supply circuit 200 includes a diode (D1) 226, a diode (D2) 234, and a diode (D3) 216.

One end of the resistor (R0) 204 is an input terminal. The other end of the resistor (R0) 204 is coupled to the resistor (R1) 206, the resistor (R9) 212, the emitter of the transistor (Tr3) 214, the cathode of the diode (D3) 216, the capacitor (C0) 218, and the load 202.

The other end of the load 202, which is different from one end of the load 202 coupled to the resistor (R0) 204, is grounded.

The other end of the resistor (R1) 206, which is different from one end of the resistor (R1) 206 coupled to the resistor (R0) 204, is coupled to the resistor (R2) 208 and a Reference terminal of the shunt regulator 210.

The other end of the resistor (R2) 208, which is different from one end of the resistor (R2) 208 coupled to the resistor (R1) 206, is grounded.

The other end of the resistor (R9) 212, which is different from one end of the resistor (R9) 212 coupled to the resistor (R0) 204, is coupled to a Cathode terminal of the shunt regulator 210 and the base of the transistor (Tr3) 214. The other end of the resistor (R9) 212, which is different from the one end of the resistor (R9) 212 coupled to the resistor (R0) 204, is coupled to the Cathode terminal of the shunt regulator 210 via the resistor (R10) 213.

The other end of the capacitor (C0) 218, which is different from one end of the capacitor (C0) 218 coupled to the resistor (R0) 204, is grounded.

The collector of the transistor (Tr3) 214 is coupled to the resistor (R3) 220, the resistor (R5) 222, the anode of the diode (D1) 226, and the anode of the diode (D2) 234.

The other end of the resistor (R3) 220, which is different from one end of the resistor (R3) 220 coupled to the collector of the transistor (Tr3) 214, is coupled to the resistor (R4) 238 and the base of the transistor (Tr2) 240.

The other end of the resistor (R5) 222, which is different from one end of the resistor (R5) 222 coupled to the collector of the transistor (Tr3) 214, is coupled to the resistor (R6) 224 and the base of the transistor (Tr1) 232.

The other end of the resistor (R6) 224, which is different from one end of the resistor (R6) 224 coupled to the resistor (R5) 222, is grounded.

The cathode of the diode (D1) 226 is coupled to the resistor (R7) 228. The other end of the resistor (R7) 228, which is different from one end of the resistor (R7) 228 coupled to the cathode of the diode (D1) 226, is coupled to the emitter of the transistor (Tr1) 232 and the plus side of the secondary battery (BT1) 230. The minus side of the secondary battery (BT1) 230 is grounded.

The collector of the transistor (Tr1) 232 is coupled to the minus side of the secondary battery (BT2) 236 and the collector of the transistor (Tr2) 240.

The cathode of the diode (D2) 234 is coupled to the anode of the diode (D3) 216 and the plus side of the secondary battery (BT2) 236.

The other end of the resistor (R4) 238, which is different from one end of the resistor (R4) 238 coupled to the resistor (R3) 220, is grounded.

The emitter of the transistor (Tr2) 240 is coupled to the resistor (R8) 242. The other end of the resistor (R8) 242, which is different from one end of the resistor (R8) 242 coupled to the emitter of the transistor (Tr2) 240, is grounded.

Referring to FIG. 5, the current flowing through the resistor (R0) 204 is denoted by the "current I0" and the load current flowing through the load 202 is denoted by the "load current Iz." The current flowing through the diode (D1) 226 is denoted by the "current Ib1" and the current flowing through the diode (D2) 234 is denoted by the "current Ib2." The current flowing through the diode (D3) 216 is denoted by the "current Ia." The current I0 may be the current supplied by applying the voltage V0 to the power supply circuit 200. The current I0 flowing through the resistor (R0) 204 may be referred to as a limited current value.

The resistor (R0) 204 limits the load current Iz of the load 202. The shunt regulator 210 controls the load voltage Vz to be applied to the load 202 so as to be kept the load voltage Vz at a certain value. For example, the shunt regulator 210 may function as a switch that causes current to flow through a bypass circuit in order to keep the load voltage Vz of the load at the certain value.

In the power supply circuit 200, when the load current Iz is smaller than the limited current value, the secondary battery (BT1) 230 and the secondary battery (BT2) 236 are charged with the current Ib1+the current Ib2. When the load current Iz is larger than the limited current value, the charge is stopped and the shortfall is compensated for by the discharge from the secondary battery (BT1) 230 and the secondary battery (BT2) 236. The current compensating for the load current Iz may be the current Ia. For example, the current I0 and the current Ia flow through the load 202.

When the voltage of the secondary battery (BT1) 230 is denoted by the "voltage Vb" and the voltage of the secondary battery (BT2) 236 is dented by the "voltage Vb", "the voltage Vb<the load voltage Vz<2×the voltage Vb" may be established. For example, the load voltage Vz may be higher than the voltage Vb. The load voltage Vz may be set to a value that is lower than twice of the voltage Vb. When the secondary battery (BT1) 230 is coupled in parallel to the secondary battery (BT2) 236, no current may flow through the load 202 because the voltage Vb<the load voltage Vz. For example, the secondary battery (BT1) 230 and the secondary battery (BT2) 236 are charged. When the secondary battery (BT1) 230 is coupled in series to the secondary battery (BT2) 236, the current flows through the load 202 because the load voltage Vz<2×the voltage Vb. For example, the current is supplied from the secondary battery (BT1) 230 and the secondary battery (BT2) 236 to the load 202.

The shunt regulator 210 includes an Anode (A) terminal, a Cathode (K) terminal, and a Reference (R) terminal. The shunt regulator 210 includes a shunt transistor 2102, an error amplifier 2104, a diode 2106, and a diode 2108. The collector of the shunt transistor 2102 functions as the Cathode terminal and the emitter of the shunt transistor 2102 functions as the Anode terminal. A non-inverting input of the error amplifier 2104 functions as the Reference terminal.

The shunt regulator 210 controls the load voltage Vz to be applied to the load 202 so as to be made the load voltage Vz a certain setting value. The setting value of the load voltage Vz is set by the resistor (R1) 206 and the resistor (R2) 208. When the load voltage Vz is increased to a voltage higher than the setting value, short-circuit occurs between the Cathode terminal and the Anode terminal. When the load voltage Vz is decreased to a value lower than the setting value, the circuit is opened between the Cathode terminal and the Anode terminal.

Since the load voltage Vz makes the Cathode terminal and the Anode terminal short-circuit or open, the current flowing through the resistor (R0) 204 is controlled. For example, the shunt regulator 210 performs the control so as to make the voltage drop based on the resistor (R0) 204 constant to stably supply the voltage to the load 202.

The capacitor (C0) 218 may be a capacitor for removing ripple components. The capacitor (C0) 218 removes the ripple components that occur based on the switching function of the shunt regulator 210.

Difference current corresponding to the difference between the limited current value I0 and the load current Iz flowing through the load 202 may be referred to as the current Ib1+the current Ib2. The secondary battery (BT1) 230 is charged with the current Ib1 in the current Ib1+the current Ib2 and the secondary battery (BT2) 236 is charged with the current Ib2 in the current Ib1+the current Ib2.

When the load current Iz flowing through the load 202 becomes smaller than the current I0 flowing through the resistor (R0) 204, the voltage drop based on the resistor (R0) 204 is decreased. The decrease in the voltage drop based on the resistor (R0) 204 increases the load voltage Vz to be applied to the load 202. If the load voltage Vz increases to a value higher than or equal to a certain value, the shunt regulator 210 makes the Cathode terminal and the Anode terminal short-circuit. The occurrence of the short-circuit between the Cathode terminal and the Anode terminal of the shunt regulator 210 decreases the base voltage of the transistor (Tr3) 214. The decrease in the base voltage of the transistor (Tr3) 214 turns on the transistor (Tr3) 214. The transistor (Tr1) 232 is turned off in response to an increase in the base voltage. The transistor (Tr2) 240 is turned on in response to an increase in the base voltage.

Accordingly, the secondary battery (BT1) 230 is coupled in parallel to the secondary battery (BT2) 236. For example, the shunt regulator 210 switches the transistor (Tr1) 232, the transistor (Tr2) 240, and the transistor (Tr3) 214 so that the secondary battery (BT1) 230 is coupled in parallel to the secondary battery (BT2) 236. For example, each of the transistor (Tr1) 232, the transistor (Tr2) 240, and the transistor (Tr3) 214 may function as a switch.

The secondary battery (BT1) 230 is charged with the current Ib1 via the diode (D1) 226 and the resistor (R7) 228. The secondary battery (BT2) 236 is charged with the current Ib2 via the diode (D2) 234 and the resistor (R8) 242. For example, one secondary battery is divided into the secondary battery (BT1) 230 and the secondary battery (BT2) 236 by the transistor (Tr1) 232 and the transistor (Tr2) 240, and the secondary battery (BT1) 230 is coupled in parallel to the secondary battery (BT2) 236.

When the load 202 needs a current value exceeding the limited current value I0, contrary to the charge, the discharge from the secondary battery (BT1) 230 and the secondary battery (BT2) 236 causes the difference current Ia between the load current Iz which the load 202 needs and the current I0 to be supplied to the load 202.

When the load current Iz flowing through the load 202 becomes larger than the current I0 flowing through the resistor (R0) 204, the voltage drop is increased due to the resistor (R0) 204. The increase in the voltage drop due to the resistor (R0) 204 decreases the load voltage Vz to be applied to the load 202. When the load voltage Vz decreases to a value lower than a setting value, the shunt regulator 210 operates so as to open the circuit between the Cathode terminal and the Anode terminal. Since the shunt regulator 210 operates so as to open the circuit between the Cathode terminal and the Anode terminal, the base voltage of the transistor (Tr2) 240 and the base voltage of the transistor (Tr3) 214 increase. The transistor (Tr2) 240 and the transistor (Tr3) 214 are turned off in response to the increase in the base voltages. The base voltage of the transistor (Tr1) 232 is decreased. The decrease in the base voltage turns on the transistor (Tr1) 232.

The secondary battery (BT1) 230 is coupled in series to the secondary battery (BT2) 236 via the diode (D3) 216 and the transistor (Tr1) 232. For example, the shunt regulator 210 switches the transistor (Tr1) 232, the transistor (Tr2) 240, and the transistor (Tr3) 214 so that the secondary battery (BT1) 230 is coupled in series to the secondary battery (BT2) 236. For example, each of the transistor (Tr1) 232, the transistor (Tr2) 240, and the transistor (Tr3) 214 may function as a switch.

The secondary battery (BT1) 230 and the secondary battery (BT2) 236 that are coupled in series to each other cause the current Ia to be supplied to the load 202.

Figure 6:
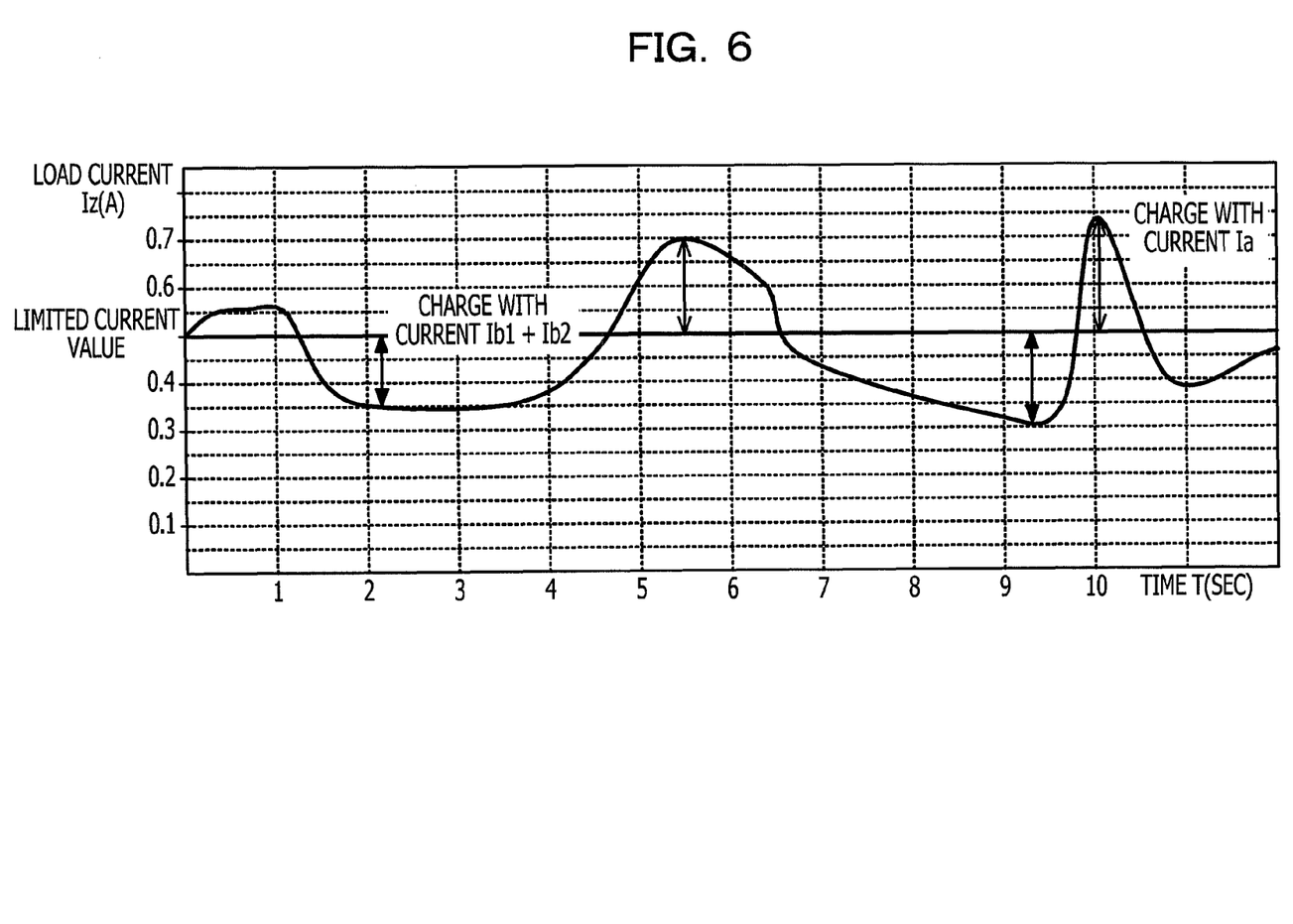
FIG. 6 illustrates an exemplary relationship between time and load current.

FIG. 6 illustrates an exemplary relationship between time and load current. The load current may be the load current Iz in the power supply circuit 200.

Referring to FIG. 6, the horizontal axis represents time T [sec] and the vertical axis represents the load current Iz [A]. The limited current value is also illustrated in FIG. 6.

When the load current Iz is larger than the limited current value I0, the discharge from the secondary battery (BT1) 230 and the secondary battery (BT2) 236 occurs. Since the secondary battery (BT1) 230 and the secondary battery (BT2) 236 discharges, the current Ia is supplied to the load 202 by the battery including the secondary battery (BT1) 230 and the secondary battery (BT2) 236 couples in series. Referring to FIG. 6, the supply of the current Ia is performed during a time period from zero seconds to about 1.25 seconds (the time T), a time period from about 4.5 seconds to about 6.5 seconds (the time T), and a time period from about 9.8 seconds to about 10.5 seconds (the time T).

When the load current Iz is smaller than the limited current value I0, the secondary battery (BT1) 230 and the secondary battery (BT2) 236 are charged with current. When the secondary battery (BT1) 230 and the secondary battery (BT2) 236 are charged with current, the secondary battery (BT1) 230 is coupled in parallel to the secondary battery (BT2) 236. The secondary battery (BT1) 230 is charged with the current Ib1 and the secondary battery (BT2) 236 is charged with the current Ib2. Referring to FIG. 6, the charge is performed during a time period from about 1.25 seconds to about 4.5 seconds (the time T), a time period from about 6.5 seconds to about 9.8 seconds (the time T), and a time period from about 10.5 seconds to about 12 seconds (the time T).

Figure 7:
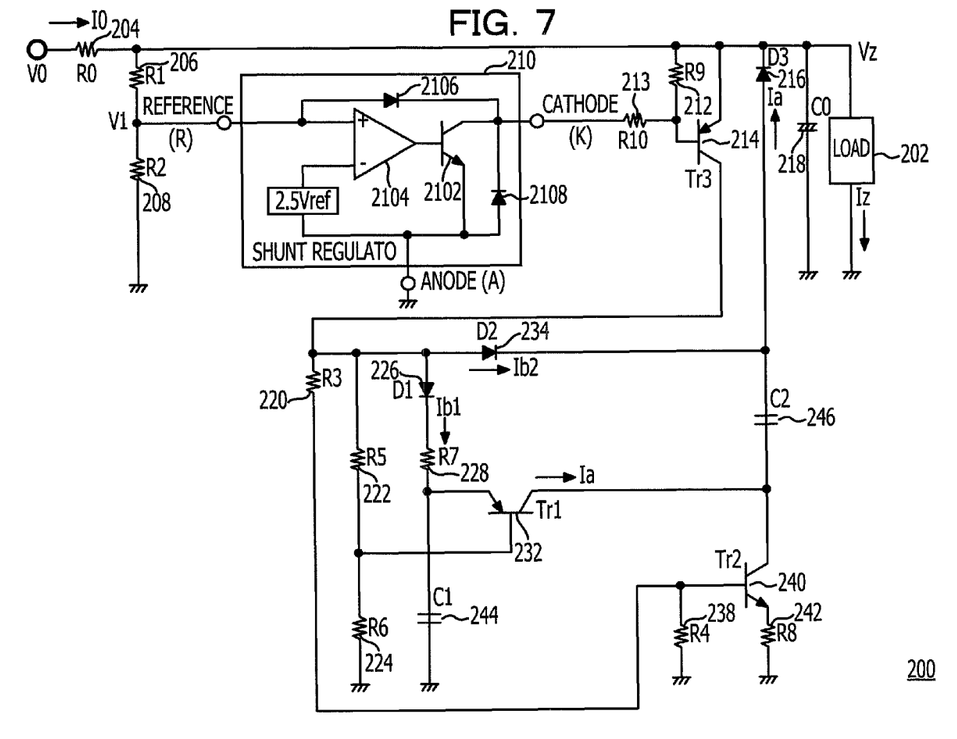
FIG. 7 illustrates an exemplary power supply circuit.

FIG. 7 illustrates an exemplary power supply circuit.

In the power supply circuit 200 illustrated in FIG. 7, a capacitor (C1) 244 and a capacitor (C2) 246 may be used, instead of the secondary battery (BT1) 230 and the secondary battery (BT2) 236, respectively, illustrated in FIG. 5.

In the power supply circuit 200 illustrated in FIG. 7, when the load current Iz is smaller than the limited current value I0, the capacitor (C1) 244 and the capacitor (C2) 246 are charged with the current Ib1+the current Ib2. When the load current Iz is larger than the limited current value J0, the charge is stopped and the shortfall of the load current Iz is compensated for from the capacitor (C1) 244 and the capacitor (C2) 246. For example, when the shortfall of the load current Iz is equal to the current Ia, the current I0 and the current Ia flow through the load 202. Since the increase in capacitance of the capacitor (C1) 244 and the capacitor (C2) 246 increases the accumulated amount of electricity, the discharge time may be increased.

The capacitance of the capacitor (C1) 244 may be different from that of the capacitor (C2) 246. The capacitance of the capacitor (C1) 244 may be substantially equal to that of the capacitor (C2) 246. The substantial equality between the capacitance of the capacitor (C1) 244 and the capacitance of the capacitor (C2) 246 may reduce non-flowing of the current based on completion of the discharge of either of the capacitors.

When the voltage of the capacitor (C1) 244 is denoted by the "voltage Vb" and the voltage of the capacitor (C2) 246 is denoted by the "voltage Vb", an inequality the voltage Vb<the load voltage Vz<2×the voltage Vb may be established. For example, the load voltage Vz may be higher than the voltage Vb. The load voltage Vz may be set to a value that is lower than twice of the voltage Vb. When the capacitor (C1) 244 is coupled in parallel to the capacitor (C2) 246, no current flows through the load 202 because the voltage Vb<the load voltage Vz. For example, the capacitor (C1) 244 and the capacitor (C2) 246 are charged with current. When the capacitor (C1) 244 is coupled in series to the capacitor (C2) 246, the current flows through the load 202 because the load voltage Vz<2×the voltage Vb. For example, the current is supplied from the capacitor (C1) 244 and the capacitor (C2) 246 to the load 202.

In the power supply circuit 200 illustrated in FIG. 7, either of the capacitor (C1) 244 and the capacitor (C2) 246 may be a secondary battery.

When the voltage of the secondary battery is substantially equal to the "voltage Vb", an inequality the voltage Vb<the load voltage Vz may be established. For example, the load voltage Vz may be higher than the voltage Vb. When the capacitor is coupled in parallel to the secondary battery, no current flows through the load 202 because the voltage Vb<the load voltage Vz. For example, the capacitor and the secondary battery are charged with current.

Figure 8:
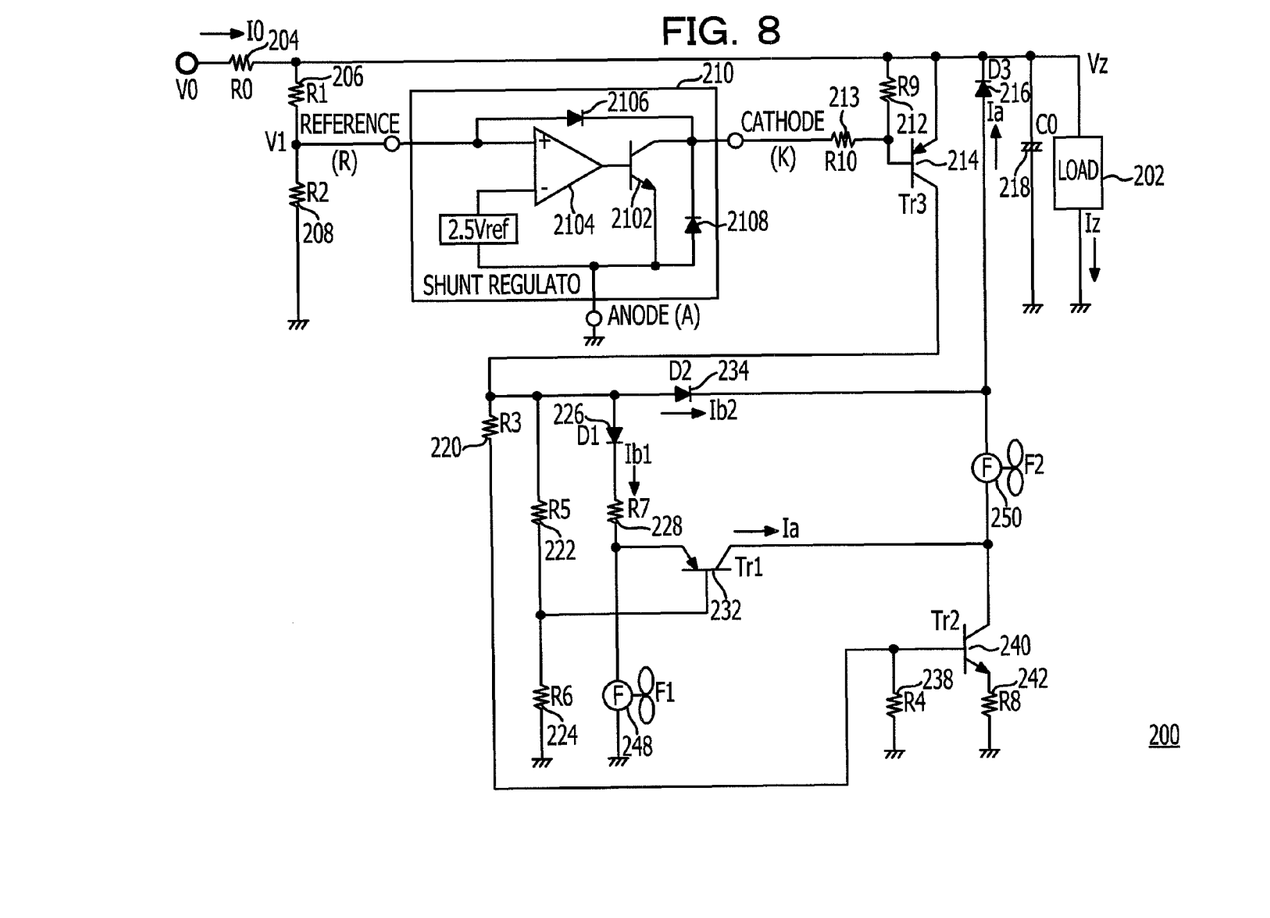
FIG. 8 illustrates an exemplary power supply circuit.

FIG. 8 illustrates an exemplary power supply circuit.

In the power supply circuit 200 illustrated in FIG. 8, a fan (FT1) 248 and a fan (FT2) 250 are used, instead of the secondary battery (BT1) 230 and the secondary battery (BT2) 236, respectively, illustrated in FIG. 5. The fan (FT1) 248 and the fan (FT2) 250 may each have a function to generate power based on the rotation of the fan. Each of the fan (FT1) 248 and the fan (FT2) 250 may be a power generator.

In the power supply circuit 200 illustrated in FIG. 8, when the load current Iz is smaller than the limited current value I0, the fan (FT1) 248 and the fan (FT2) 250 rotate by the current Ib1+the current Ib2. When the load current Iz is larger than the limited current value I0, the charge is stopped and the shortfall of the load current Iz is compensated for from fan (FT1) 248 and the fan (FT2) 250. For example, the electromotive force caused by the power generated based on the rotation of the fan (FT1) 248 and the fan (FT2) 250 causes the current to be supplied to the load 202. The current Ia occurring due to the power generated based on the rotation of the fan (FT1) 248 and the fan (FT2) 250 is supplied to the load 202.

In the power supply circuit 200 illustrated in FIG. 8, either of the fan (FT1) 248 and the fan (FT2) 250 may be a secondary battery or a capacitor.

Since the current is supplied also from the capacitor that has been charged in advance before the performance or the function of the load (circuit) is degraded, a decrease in the performance or the function of the load, which is caused by the excess of the current supplied from the power supply over the current which the load needs, may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A power supply circuit includes:
a load;
a resistor coupled the load;
a first secondary battery; a second secondary battery;
a switch configured to switch between a first state in which the first secondary battery and the second secondary battery are charged and a second state in which load current is supplied from the first secondary battery and the second secondary battery to the load; and a shunt regulator configured to control the switch based on current flowing through the resistor so as to switch between the first state and the second state.

2. The power supply circuit according to claim 1, wherein the shunt regulator controls load voltage to be applied to the load so as to be kept at a certain value.

3. The power supply circuit according to claim 1, wherein, when switching to the first state, the switch performs the switching so as to charge the first secondary battery and the second secondary battery with difference current which is a difference between the current flowing through the resistor and the load current.

4. The power supply circuit according to claim 1, wherein, when switching to the first state, the switch performs the switching so that the first secondary battery is coupled in series to the second secondary battery.

5. The power supply circuit according to claim 1, wherein, when switching to the second state, the switch performs the switching so as to cause the first secondary battery and the second secondary battery to discharge to supply difference current to the load, the difference current being a difference between the load current and the current flowing through the resistor.

6. The power supply circuit according to claim 1, wherein, when switching to the second state, the switch performs the switching so that the first secondary battery is coupled in parallel to the second secondary battery.

7. The power supply circuit according to claim 1, wherein a capacitance of the first secondary battery is substantially equal to a capacitance of the second secondary battery.

8. The power supply circuit according to claim 2, wherein $Vb<Vz<2\times Vb$, where Vb denotes a voltage of the first secondary battery and a voltage of the second secondary battery and Vz denotes the load voltage.

9. The power supply circuit according to claim 1, wherein the shunt regulator controls the switch so as to switch to the second state when a voltage to be applied to the resistor is decreased.

10. The power supply circuit according to claim 1, wherein the first secondary battery includes a first capacitor, and wherein the second secondary battery includes a second capacitor.

11. The power supply circuit according to claim 10, wherein a capacitance of the first capacitor is substantially equal to a capacitance of the second capacitor.

12. The power supply circuit according to claim 2, wherein the first secondary battery includes a capacitor.

13. The power supply circuit according to claim 12, wherein $Vb<Vz$, where Vz denotes the load voltage and Vb denotes a voltage of the first secondary battery.

14. A base station comprising:
an electronic circuit including:
a load;
a resistor coupled to the load;
a first secondary battery;
a second secondary battery;
a switch configured to switch between a first state in which the first secondary battery and the second secondary battery are charged and a second state in which load current is supplied from the first secondary battery and the second secondary battery to the load; and
a shunt regulator configured to control the switch based on current flowing through the resistor so as to switch between the first state and the second state.

* * * * *